United States Patent [19]

Takada

[11] Patent Number: 4,770,365

[45] Date of Patent: Sep. 13, 1988

[54] SEAT BELT RETRACTOR

[76] Inventor: Juichiro Takada, 12-1, 3 chome, Shinmachi, Setagayaku, Tokyo, Japan

[21] Appl. No.: 99,386

[22] Filed: Sep. 21, 1987

[30] Foreign Application Priority Data

Sep. 26, 1986 [JP] Japan .............................. 61-146472[U]
Oct. 8, 1986 [JP] Japan .............................. 61-153782[U]

[51] Int. Cl.⁴ ............................................. B60R 22/44
[52] U.S. Cl. .................................... 242/107.7; 280/807
[58] Field of Search ......................... 242/107.7, 107.6; 280/807, 808, 806

[56] References Cited

U.S. PATENT DOCUMENTS 4,386,744 6/1983 Higbee .............................. 242/107.7

FOREIGN PATENT DOCUMENTS

2126078 3/1984 United Kingdom ............. 242/107.7

Primary Examiner—John M. Jillions
Attorney, Agent, or Firm—Brumbaugh, Graves, Donohue & Raymond

[57] ABSTRACT

A vehicle seat belt retractor comprises a tension-relief mechanism in which a spring-biased hook pivotably mounted on a hook carrier that rotates with the belt reel selectively engages teeth on a stationary stop ring to lock the reel against rotation. The hook is in some states of operation latched by a latch spring so that it cannot engage the stop ring. Latching and unlatching of the hook is controlled by an abutment on an actuator ring that is coupled to the stop ring by a friction clutch. The actuator ring also has a peripheral wall that is engaged by the hook in certain states to prevent the hook from engaging the stop ring. A notch in the peripheral wall allows the hook to pivot out to engage the stop ring in the tension-relief mode.

3 Claims, 8 Drawing Sheets

SEAT BELT RETRACTOR

BACKGROUND OF THE INVENTION

In many types of vehicle seat belt retractors the design of the winding spring involves reaching a compromise between, on the one hand, providing a winding force large enough to wind the belt into the reel and, on the other hand, providing a winding force that is small enough to prevent causing discomfort to the occupant when the belt is in place. Because even a compromise in the design of the winding spring is not always satisfactory, usually because even a low winding force pulling the belt against the user's torso and waist can be bothersome, it is known to provide tension-relief mechanisms in seat belt retractors. The tension-relief mechanism may either lower the belt tension or eliminate the tension entirely when the belt is in place for proper restraint. Several known tension-relief mechanisms operate in response to a sequence of winding and unwinding motions of the belt.

Many of the tension-relief mechanisms proposed heretofore are relatively complicated, thus making the retractor more costly, often making it significantly larger in size, and sometimes increasing the chance of malfunction.

SUMMARY OF THE INVENTION

An object of the present invention is to provide a seat belt retractor with a tension-relief mechanism that is of simple construction so that it can be produced economically, will not significantly increase the size of the retractor, and will function reliably over a long service life. The foregoing object is attained, according to the present invention, by a vehicle seat belt retractor having a frame, a belt reel rotatably mounted in the frame, a spring coupled between the frame and the belt reel and continuously urging the belt reel in rotation in a direction to wind a belt into the reel, and a tension-relief mechanism adapted selectively to stop rotation of the belt reel in the belt-winding direction in response to a predetermined sequence of rotational motions of the reel. The invention is characterized in that the tension-relief mechanism comprises a hook carrier coupled to the belt reel for rotation therewith, a hook pivotably mounted on the hook carrier, a biassing spring urging the hook in rotation about its pivot axis in a direction to move a tip portion of the hook outwardly, relative to the axis of rotation of the belt reel, and a latch spring adapted selectively to latch the hook against outward rotation under the urging of the biassing spring. A stop ring having internal teeth engageable by the tip portion of the hook when it is urged outwardly by the biassing spring is arranged to be fixed to the frame against rotation and to thereby prevent rotation of the hook carrier and belt reel when the hook engages the stop ring. A hook actuator disk having a peripheral flange portion located inwardly of the teeth of the stop ring and outwardly of the path of the hook as it orbits with the hook carrier upon rotation of the belt reel prevents engagement of the tip portion of the hook with the teeth of the stop ring in certain states of operation of the mechanism. The flange portion has a notch through which the hook selectively extends outwardly for engagement with the teeth of the stop ring. The actuator disk further includes an abutment located to engage selectively the tip portion and a rear portion of the hook upon rotations of the belt reel and hook carrier in the respective belt-winding and the belt-unwinding directions of rotation of the reel relative to the actuator disk. A friction clutch is interposed between the actuator disk and the stop ring to inhibit rotation of the actuator disk except when the tip portion or the rear portion of the hook engages the abutment so that the hook can rotate with the hook carrier relative to the actuator disk between positions where the hook is prevented from engaging the teeth of the stop ring by engaging the peripheral wall and where the hook is permitted to extend outwardly through the notch in the peripheral wall and engage the teeth of the stop ring under the bias of the biassing spring.

In one embodiment the stop ring is affixed to the frame against rotation by a functionally permanent fastener. In another embodiment the stop ring is affixed to the frame by a mechanism that engages the stop ring when the vehicle door is closed, thereby preventing rotation of the stop ring, and that disengages the stop ring when the vehicle door is open to enable the stop ring to rotate with the belt reel and hook carrier.

For a better understanding of the invention, reference may be made to the following description of exemplary embodiments, taken in conjunction with the accompanying drawings.

DESCRIPTION OF THE EMBODIMENTS

Figure 1:
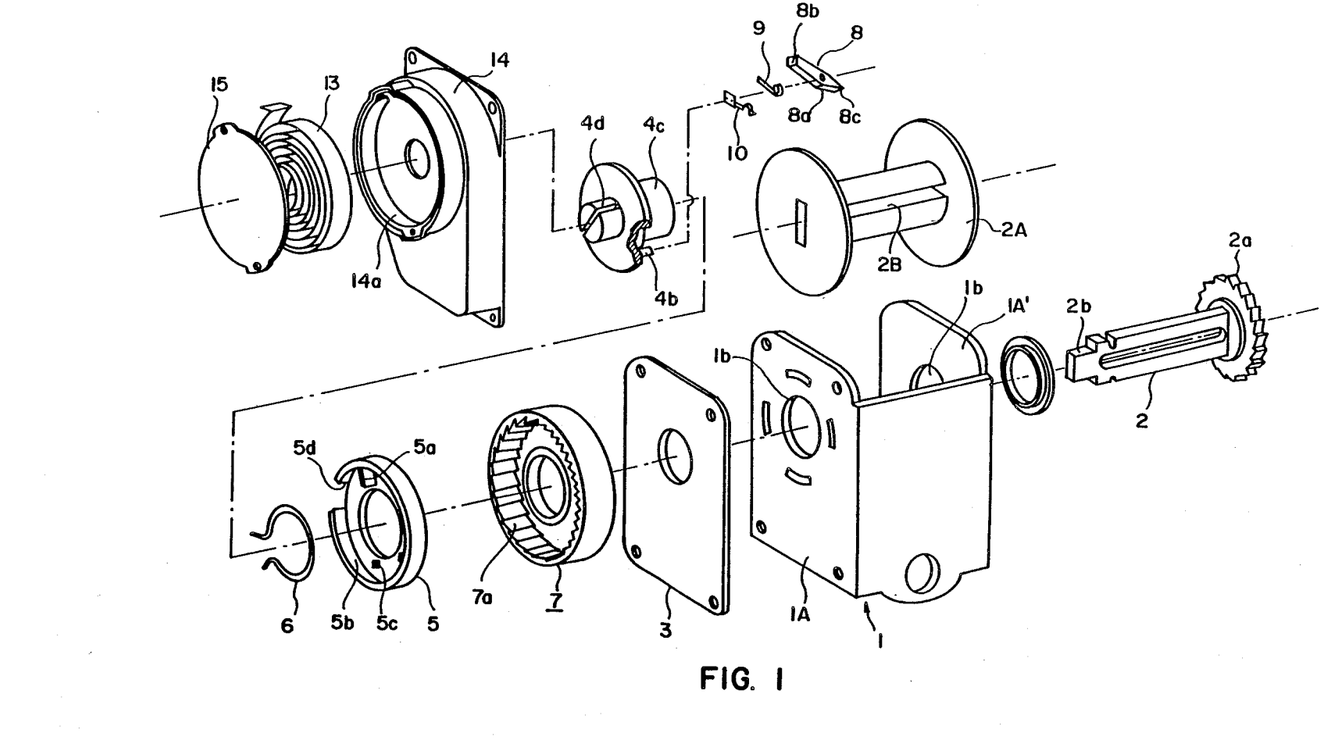
FIG. 1 is an exploded pictorial view of a first embodiment.

Apart from the tension-relief mechanisms, both embodiments comprise the conventional and well-known components of seat belt retractors. Various specific designs for the conventional components can be used. Referring to FIG. 1, the retractor comprises a frame 1 which has a channel-shaped cross-section with holes 1b, 1b' disposed in the respective side walls 1A, 1A'. A reel shaft 2 is received in the holes 1b, 1b' of the frame 1. A ratchet wheel 2a of an emergency locking mechanism (not shown) having any suitable construction, many of which are per se well known in the art, is secured to one of the ends of the reel shaft 2, and a square extension 2b is formed at the other end. A belt reel 2A is assembled onto the shaft 2 in such a manner as to rotate with the reel shaft 2 and is received between the side walls 1A and 1A' of the frame 1. It has a slot 2B for retaining the inner end of a belt B (FIG. 2) at its axial portion. A bearing plate 3 is secured by suitable means to the side wall 1A of the frame 1 and supports rotatably a boss portion 4c of a hook carrier 4. The hook carrier 4 has a boss 4c that receives the square extension 2b of the reel shaft 2, a boss 4d that holds the inner end of a belt-winding spring 13 and a post 4b on its flange 4a that supports a hook 8.

Reference numeral 5 designates a hook actuator disk, which is equipped with a ring-like outer peripheral wall 5b, an inner abutment 5a capable of engaging the hook 8 supported by the hook carrier 4, and a notch 5d formed by partially cutting off the outer peripheral wall 5b. The actuator disk 5 is connected slidably with a predetermined frictional force with a stop ring 7 by a clutch spring 6. The stop ring 7 is fixed by suitable functionally permanent fasteners, such as screws or rivots, to the bearing plate and has teeth 7a projecting inwardly from a flange portion. The boss 4c of the hook carrier 4 is fitted rotatably to the center opening of the stop ring 7.

Figure 3:
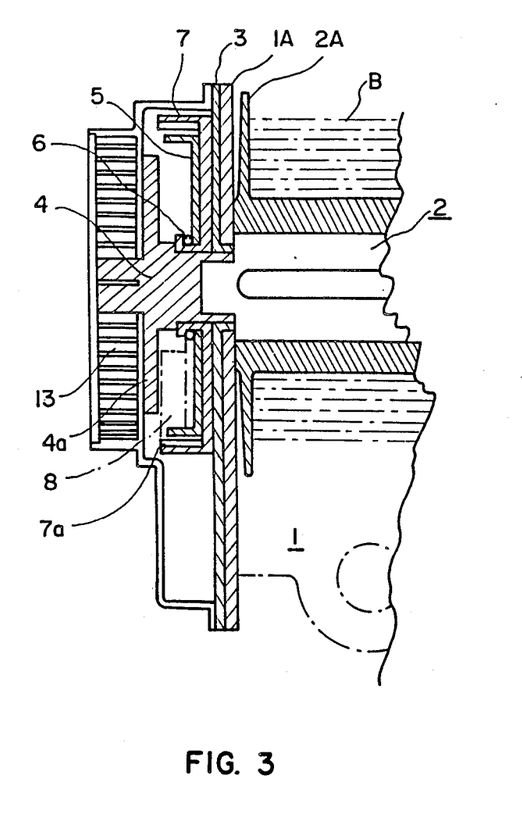
FIG. 3 is a partial cross-sectional view taken along an axial plane of the first embodiment.

The hook 8 is supported rotatably by the post 4b of the hook carrier 4 and is biassed by two springs 9 and 10 so that its tip 8b rotates between a position in which it meshes with the teeth 7a of the stop ring and a position in which it is held away from the teeth. The first spring 9 is a biassing spring and is mounted on the projection 4b of the hook retainer 4 and urges the hook 8 to pivot such that the tip 8b meshes with the teeth 7a of the stop ring 7. The second spring 10 is a latch spring and is secured by a lug at its base end to the hook carrier 4 by a rivet or a screw. When the hook 8 engages the abutment 5a of the hook actuator disk 5 and rotates in the direction represented by arrow A, as shown in FIG. 3, its tip 10a engages a notch 8a in the hook 8 and latches the hook 8 in a position where the tip 8b of the hook 8 cannot engage the teeth 7a of the stop ring 7.

The belt-winding spring is stored in a storage portion 14a of a cover 14 fitted to the side wall 1A of the frame 1 and constantly urges the reel shaft 2 in the belt-winding direction (clockwise in FIG. 1), acting through the hook carrier 4. A cap 15 for the belt-winding spring 13 is fitted to the cover 14.

Figure 4:
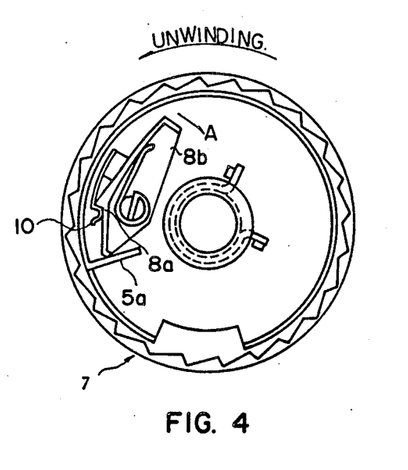
FIGS. 4 to 6 are end elevational views of the tension-relief mechanism of the first embodiment, showing it in different stages of its operation.
Figure 6:
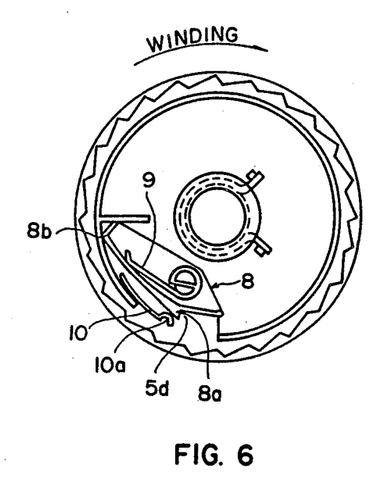
Figure 7:
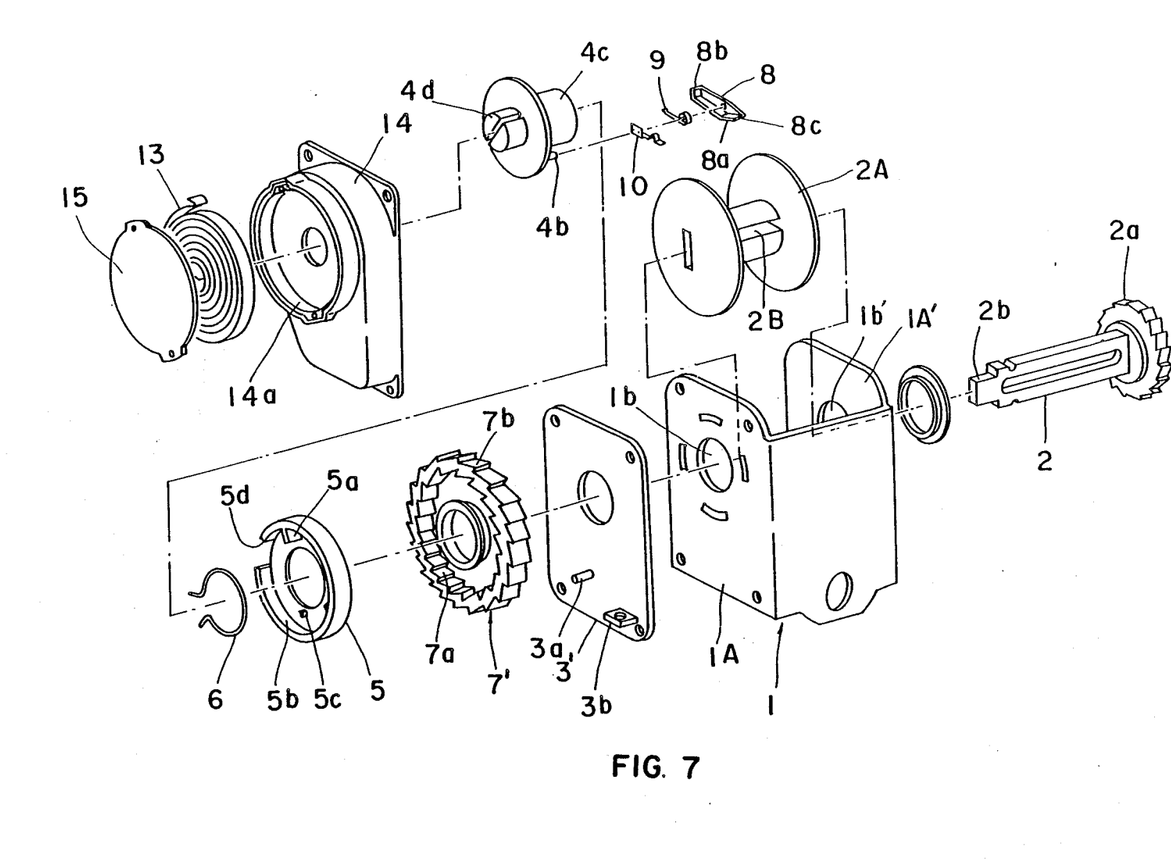
FIG. 7 is an exploded pictorial view of a second embodiment.
Figure 8:
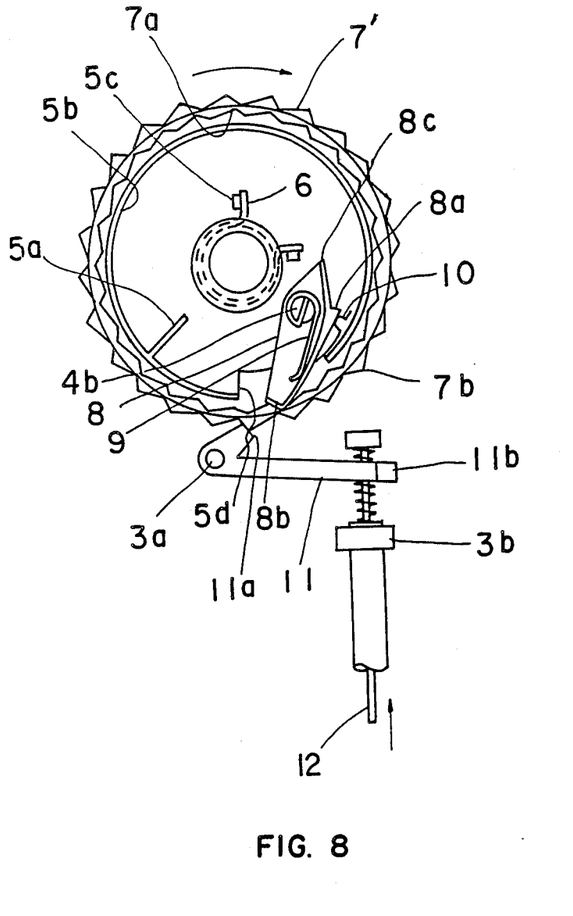
FIG. 8 is an end elevational view of the tension-relief mechanism of the second embodiment.
Figure 9:
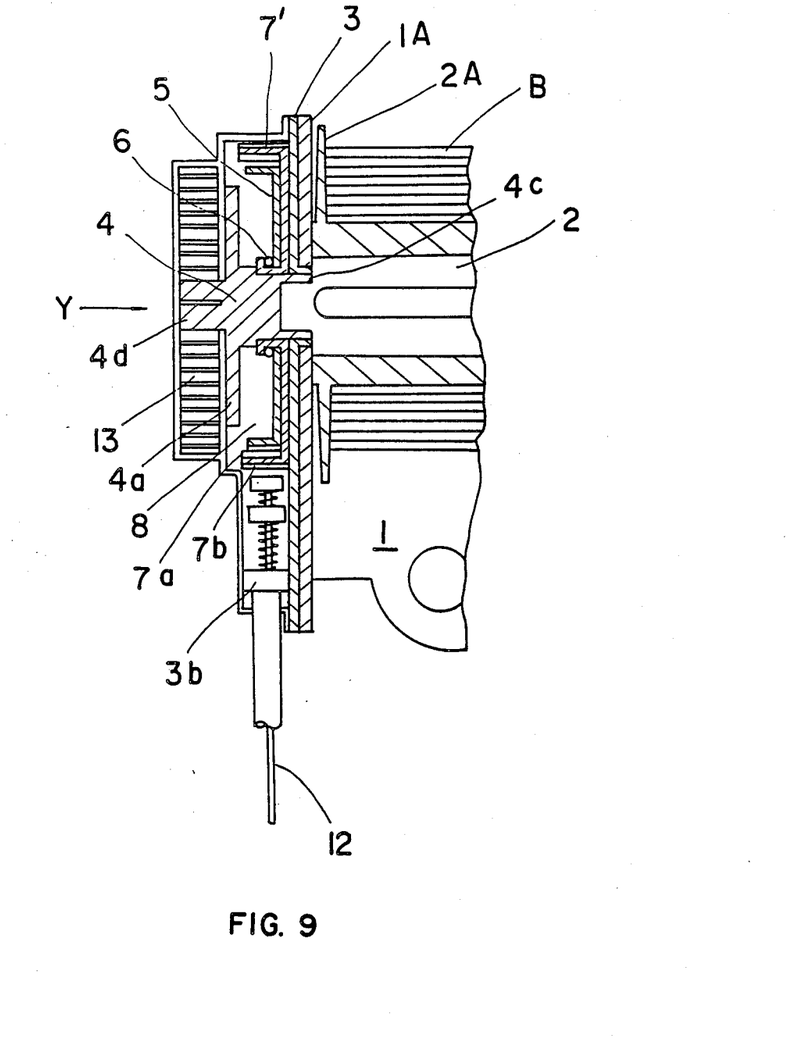
FIG. 9 is a partial axial cross-sectional view of the second embodiment.
Figure 10:
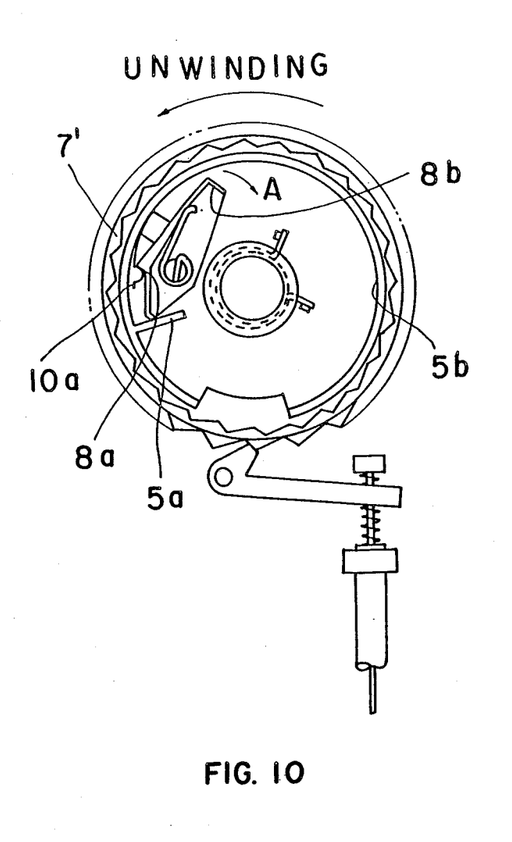
FIGS. 10 to 12 are end elevational views of the second embodiment, showing it at different stages of its operation.
Figure 11:
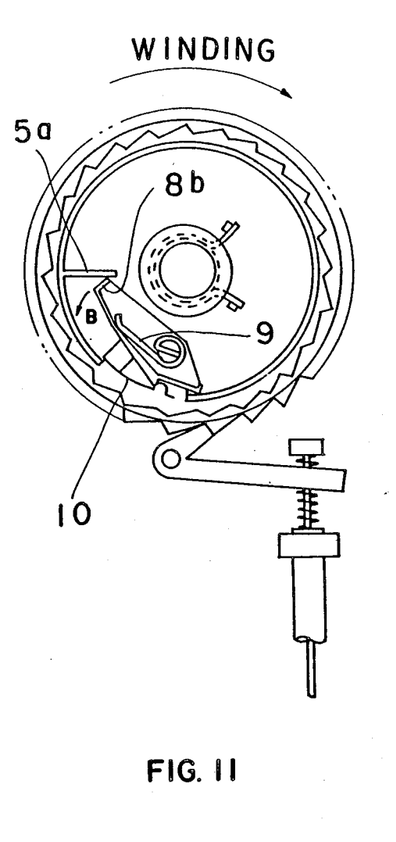
Figure 12:
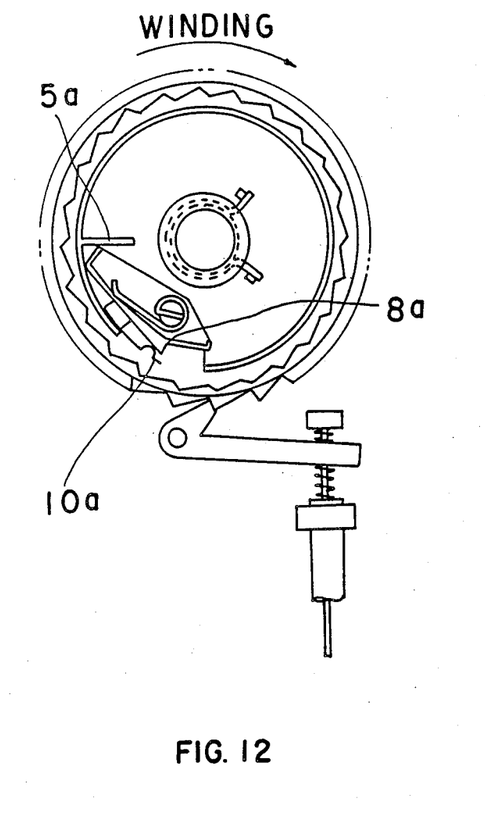

FIG. 6 shows the state of the tension-relief mechanism when the belt is retracted onto the reel. Beginning in this state, when the user pulls out the belt, the reel shaft 2 and the hook carrier rotate counter-clockwise (all motions described herein are, of course, with reference to the drawings) against the force of the belt-winding spring 13. At the beginning of this rotation the tip 8b of the hook 8 passes through the notch portion 5d of the hook actuator disk 5, which is held stationary against rotation by the clutch spring 6. During a little less than one full revolution counter-clockwise of the hook carrier ring, the hook, which is biassed by the spring 9, slides along the outer peripheral wall 5b of the hook actuator disk 5, and is kept inside the outer peripheral wall 5b so that it cannot engage the teeth 7a of the stop ring 7. When the rear end 8c of the hook 8 engages the abutment 5a of the actuator ring 5, the hook 8 pivots in the direction represented by the arrow A, as shown in FIG. 4, and the notch 8a in the hook is moved into mesh with the tip 10a of the latch spring 10. Then, in the state shown in FIG. 4, that is, the state where the tip 8b of the hook 8 is latched against the bias of the spring 9, the actuator ring 5 is rotated counter-clockwise with the reel and the hook carrier 4 against the frictional force of the clutch spring 6 working with the stop ring 7 by the engagement of the hook rear end 8c with the abutment 5a during subsequent withdrawal of the belt.

Figure 5:
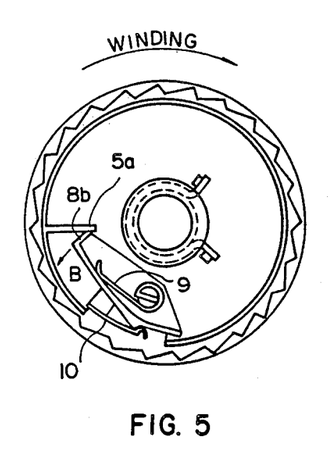

After the belt is pulled out sufficiently, the buckle tongue (not shown) at the end of the belt is done up to the buckle, and the belt is released. Then, the slack of the belt is eliminated by the winding of the belt onto the reel of the urging of the belt-winding spring 13 until the belt is engaged against the occupant in the restraining condition. At the start of winding to take up the slack the reel shaft 2 and the hook carrier 4 rotate clockwise in the drawing (see FIG. 5), but the actuator ring 5 is held stationary due to the frictional force of the clutch spring 6 acting between it and the stop ring 7. After a little less than one revolution of rotation of the hook carrier 4, the tip 8b of the hook 8 strikes the abutment 5a of the hook actuator ring 5 from the side opposite to the case shown in FIG. 4, so that the hook 8 rotates in the direction represented by the arrow B in FIG. 5 and enters the state shown in FIG. 6. At this point, the latched engagement between the tip 10a of the latch spring 10 and the notch 8a of the hook 8 is released, and the tip 8b of the hook 8 is urged in the outward direction toward the teeth 7a of the stop ring by the biassing spring 9. While this state (FIG. 6) exists, the hook actuator ring 5 is pushed by the hook 8 and rotates clockwise together with the hook carrier 4 and the reel shaft 2 until the slack of the belt is completely taken up. Meanwhile, the tip 8b of the hook engages the peripheral wall 5b of the actuator ring 5 and cannot engage the teeth of the stop ring.

Next, when the belt is slightly pulled out by the occupant from the state shown in FIG. 6, the hook carrier 4 rotates counter-clockwise with the reel shaft 2. Meanwhile, the clutch spring holds the actuating ring 5 stationary. When the tip 8b of the hook 8 reaches the notch 5d of the actuator ring 5, the tip 8b of the hook disengages from the inner surface of the outer peripheral wall 5b of the stop ring 5, and the hook 8 rotates counter-clockwise by the force of the biassing spring 9. The tip 8b of the hook meshes with the teeth 7a of the stop ring 7 (see FIG. 2), so that the rotation of the reel shaft 2 in the belt winding direction by the belt-winding spring 13 is prevented, and the pressure of the belt against the occupant by the belt tension is eliminated. In other words, this is the tension-less state.

Figure 2:
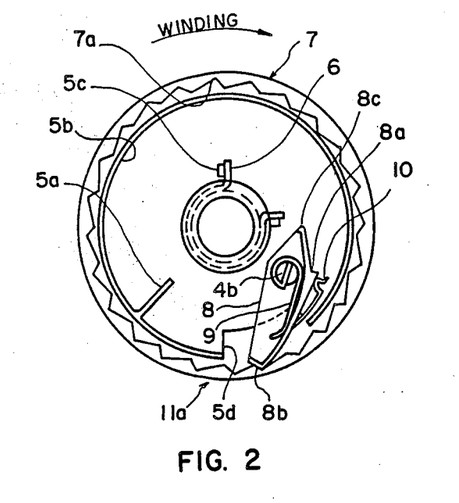
FIG. 2 is an end elevational view of the tension-relief mechanism of the first embodiment.

When the belt is pulled out to cause slightly less than one revolution of the reel from the state shown in FIG. 2 to the state shown in FIG. 4, the hook 8 is retracted by rotating inwardly in the direction of the arrow A, as described above, by engaging the peripheral wall 5b . Upon engaging the abutment 5a, the hook pivots further inwardly so that the notch 8a meshes with the tip 10a of the latch spring 10, and the tip 8b of the hook 8 is again latched at a position where it cannot engage the teeth 7a of the stop ring 7. Therefore, the tension-less state is released.

Within the range of belt reel rotation (a little less than one revolution) where the spring 10 does not latch to the notch 8a of the hook 8, the belt can return again to the tension-less state (the position shown in FIG. 2) even if the belt is pulled out slightly. Accordingly, even if the occupant leans forward slightly, the tension-less state is not released. When the passenger moves within the range described above, the outer peripheral wall 5b, of the hook actuator ring 5 maintains the tension-less position.

By pulling the belt out enough to latch the hook to the state shown in FIG. 4, and then releasing the belt, the winding state (FIG. 6) is attained, and the belt can be fully wound onto the reel. If the belt is pulled out further after hook is latched (i.e., is in the state shown in FIG. 4), such as when the occupant leans forward, a new tension-release state can be established by the sequence described above. In particular, the slack in the belt is taken up (FIGS. 5 and 6) and then the belt is pulled out slightly (FIG. 2).

The second embodiment (FIGS. 7 to 12) is the same in nearly all respects as the first embodiment. Therefore, the same reference numerals are used in FIGS. 7 to 12 as are used in FIGS. 1 to 6, and the above description is not repeated.

The second embodiment provides for complete disabling of the tension-relief mechanism when the vehicle door is opened. One end (not shown) of a sheathed drive wire 12 is connected to a spring plunger (not shown) mounted at the door opening. The sheath at the other end of the wire 12 is affixed to a lug 3b on the bearing plate 3' (See FIG. 7), while the other end of the wire itself is connected by a resilient coupling to a lever 11 pivotably mounted on a post 3a on the bearing plate. When the door is closed, the wire pivots the lever 11 counter-clockwise about the post 3a and engages the lever tip 11a with one of a set of ratchet teeth 7b on the exterior surface of the stop ring 7'. Instead of being affixed to the retractor frame 1, as in the first embodiment, the stop ring 7' of the second embodiment is rotatably supported at its central hole on the boss 4c of the hook carrier 4. However, when the lever tip 11a engages a ratchet tooth 7b, the stop ring 7' cannot rotate. In this state, the operation of the second embodiment is exactly the same as that of the first embodiment.

When the vehicle door is opened, the spring of the plunger at the door opening pulls the wire 12 out, thereby pulling the lever 11 clockwise and disengaging its tip 11a from the ratchet tooth 7b and enabling the stop ring 7' to rotate freely. Accordingly, regardless of the state of the tension-relief mechanism of the retractor and the condition of the belt (wound or unwound from the reel), when the door is opened, the tension-relief mechanism is disabled, and winding of the belt is enabled under the urging of the winding spring 13.

In the first embodiment, rewinding of the belt onto the reel when it is unbuckled requires the occupant to pull the belt out enough to latch the hook and thereby restore the tension mode. In the second embodiment that is not necessary, because the tension mode is restored by opening the door. It is largely a matter of the preference of the vehicle manufacturer whether the first or second embodiment is to be used in a vehicle.

The invention requires relatively few components, which are easy to make and assemble. It is small in size and its relative simplicity ensures reliable and long-lived operation. It is also easy for the occupant to activate and release the tension-relief mechanism, and small movements of the occupant do not cancel the tensionless state.

I claim:

1. A vehicle seat belt retractor having a frame, a belt reel rotatably mounted in the frame, a spring coupled between the frame and the belt reel and continuously urging the belt reel in rotation in a direction to wind a seat belt into the reel, and a tension-relief mechanism adapted selectively to stop rotation of the belt reel in the belt-winding direction in response to a predetermined sequence of rotational motions of the reel, characterized in that the tension-relief mechanism comprises a hook carrier coupled to the belt reel for rotation therewith, a hook pivotably mounted on the hook carrier, a biassing spring urging the hook in rotation about its pivot axis in a direction to move a tip portion of the hook outwardly, relative to the axis of rotation of the belt reel, a latch spring adapted selectively to latch the hook against outward rotation under the urging of the biassing spring, a stop ring having internal teeth engageable by the tip portion of the hook when it is urged outwardly by the biassing spring, means for fixing the stop ring to the frame against rotation and for thereby preventing rotation of the hook carrier and belt reel when the hook engages the stop ring, a hook actuator disk having a peripheral flange portion, the flange portion being located inwardly of the teeth of the stop ring and outwardly of the path of the hook as it orbits with the hook carrier upon rotation of the belt reel so as to prevent engagement of the tip portion of the hook with the teeth of the stop ring, the flange portion having a notch through which the hook selectively extends outwardly for engagement with the teeth of the stop ring, and the actuator disk further having an abutment located to engage selectively the tip portion and a rear portion of the hook upon rotations of the belt reel and hook carrier in the respective belt-winding and the belt-unwinding directions of rotation of the reel relative to the actuator disk, and friction clutch means interposed between the actuator disk and the stop ring to inhibit rotation of the actuator disk except when the tip portion or the rear portion of the hook engages the abutment so that the hook can rotate with the hook carrier relative to the actuator disk between positions where the hook is prevented from engaging the teeth of the stop ring by engaging the peripheral wall and where the hook is permitted to extend outwardly through the notch in the peripheral wall and engage the teeth of the stop ring under the bias of the biassing spring.

2. A retractor according to claim 1 and further characterized in that the means for affixing the stop ring to the frame against rotation is a functionally permanent fastener.

3. A retractor according to claim 1 and further characterized in that the means for affixing the stop ring to the frame includes means engaging the stop ring when the vehicle door is closed for preventing rotation of the stop ring and for disengaging the stop ring when the vehicle door is open to enable the stop ring to rotate with the belt reel and hook carrier.

* * * * *